US007766494B1

(12) United States Patent
Desmitt et al.

(10) Patent No.: US 7,766,494 B1
(45) Date of Patent: Aug. 3, 2010

(54) LIGHT-WEIGHT MIRROR BLANK ASSEMBLY

(75) Inventors: Steven Desmitt, Fairport, NY (US); David Strafford, Pittsford, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/186,749

(22) Filed: Aug. 6, 2008

Related U.S. Application Data

(62) Division of application No. 10/890,011, filed on Jul. 13, 2004, now Pat. No. 7,429,114.

(51) Int. Cl.
*G02B 5/08* (2006.01)
*G02B 7/182* (2006.01)
*G02B 7/192* (2006.01)

(52) U.S. Cl. ....................... 359/848; 359/846; 359/883; 428/58; 428/152; 428/184; 428/186

(58) Field of Classification Search ................ 359/846, 359/847, 870, 871, 883, 848; 428/59, 152, 428/182, 183, 184, 185, 186, 58
See application file for complete search history.

(56) References Cited

U.S. PATENT DOCUMENTS 1,285,901 A 11/1918 Bausch et al.
1,812,403 A * 6/1931 Hammer .................... 52/785.1
2,152,394 A 3/1939 Veeder
2,699,707 A * 1/1955 Bezborodko ............ 52/785.11
3,112,184 A 11/1963 Hollenbach
3,272,686 A 9/1966 Smith et al.
3,600,257 A 8/1971 Reinhardt
3,644,022 A * 2/1972 Jagdt et al. .................. 359/848
3,713,728 A 1/1973 Austin et al.
3,841,738 A 10/1974 Caplan
3,912,380 A 10/1975 Klein
3,985,429 A 10/1976 Fleischer
4,017,347 A 4/1977 Cleveland
4,124,277 A 11/1978 Stang
4,245,244 A 1/1981 Lijewshi et al.
4,387,962 A 6/1983 Gowan et al.
4,401,706 A * 8/1983 Sovilla ....................... 428/158
4,670,338 A 6/1987 Clemino
4,875,766 A 10/1989 Shimodaira et al.
4,917,934 A 4/1990 Sempolinski
5,076,700 A 12/1991 DeCaprio
5,162,143 A 11/1992 Porter et al.
5,208,704 A 5/1993 Zito
5,271,755 A 12/1993 Dietl
5,576,884 A * 11/1996 Ise et al. ..................... 359/514
5,609,942 A 3/1997 Ray
5,613,761 A 3/1997 Raby et al.

(Continued)

FOREIGN PATENT DOCUMENTS

SU 739458 6/1980

*Primary Examiner*—Ricky D Shafer
(74) *Attorney, Agent, or Firm*—RatnerPrestia

(57) ABSTRACT

A light-weight mirror blank assembly, having at least one sheet of corrugated material; and at least one face sheet in intimate contact with a surface of the sheet of corrugated material forming the light-weight mirror blank assembly. The light-weight mirror blank assembly has an areal density less than an equivalent blank assembly having a solid support structure for supporting a mirrored surface.

6 Claims, 10 Drawing Sheets

500
10
30
20

U.S. PATENT DOCUMENTS 5,640,282 A 6/1997 Ise et al.
6,045,231 A 4/2000 Martineau
6,176,588 B1 1/2001 Davis, Jr. et al.
6,598,984 B2 7/2003 Rietz et al.
7,022,629 B2 4/2006 Theriault
7,069,747 B2 7/2006 DeSmitt
7,429,114 B2 * 9/2008 Desmitt et al. .............. 359/848

* cited by examiner

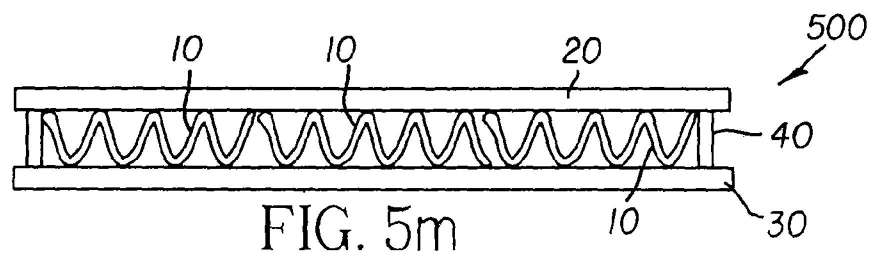
FIG. 5m
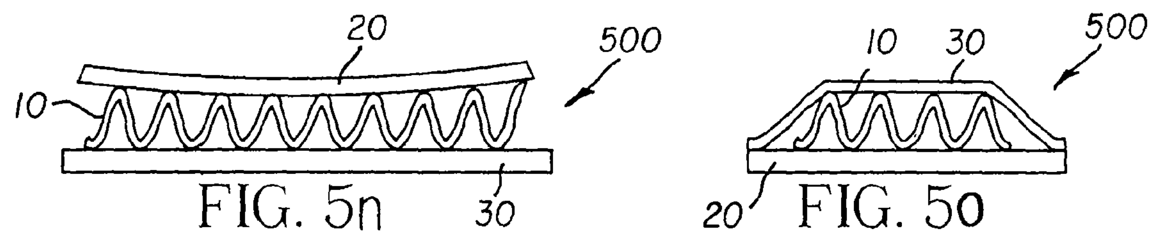
FIG. 5n
FIG. 5o
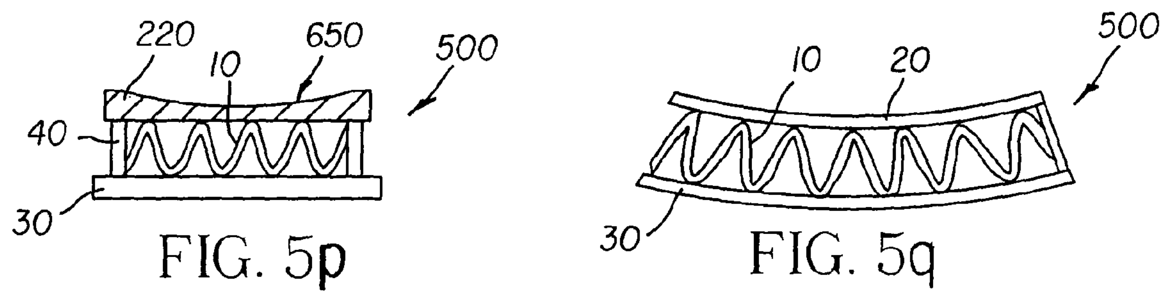
FIG. 5p
FIG. 5q
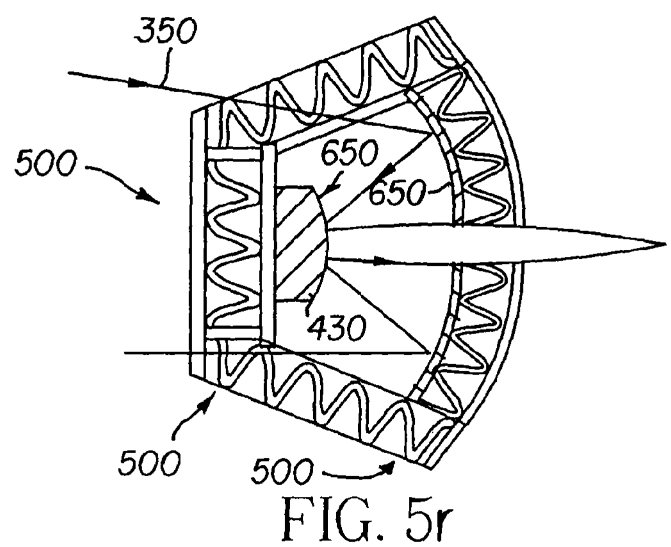
FIG. 5r

LIGHT-WEIGHT MIRROR BLANK ASSEMBLY

CROSS REFERENCE TO RELATED APPLICATIONS

This application is a divisional of U.S. application Ser. No. 10/890,011 filed Jul. 13, 2004, now U.S. Pat. No. 7,429,114, which is incorporated herein by reference in its entirety.

FIELD OF THE INVENTION

The invention relates generally to the field of light-weight mirrors and precision optics; and in particular to fabricating light-weight mirror blanks that are thermally, mechanically, and environmentally stable. More specifically, the invention relates to a mirror blank fabrication process that fuses a corrugated piece of material to face sheets.

BACKGROUND OF THE INVENTION

The need for better ground and space based telescope resolution has driven the manufacturing of larger diameters of primary mirrors of such telescopes. However, larger diameter primary mirrors result in the primary mirrors having additional weight and manufacturing problems. For example, because large solid mirror blanks weigh more, they require more time to cast and to anneal. The heavier mirror blanks also bend under their own weight, and are more difficult to maneuver in the factory. For space based mirrors, the zero gravity back-out, for testing purposes, is smaller and therefore, simpler and more accurate for light-weight mirrors. Special mounting and supporting is required if accurate testing is to be achieved.

In contrast, light-weight mirror assemblies, fabricated from light-weight mirror blanks, have the advantage of increasing the stiffness-to-weight ratio, and therefore the frequency of the first resonant mode. Light weighted mirror blanks, as it is termed in the industry by those skilled in the art, make the finished mirror assembly more tolerant of spacecraft maneuvers, as well as increasing the mirror's stability. Light-weight mirrors assemblies also result in lighter payloads and lower booster rocket power requirements.

Light-weight mirrors are the desired end product. With respect to FIG. 6, common to all mirrors is a precision surface 650, onto which a reflective material is applied. Prior to application of light weighting techniques, a monolithic material structure, was termed a mirror blank, described as solid mirror blank 450 in FIG. 6*a*. With improved light weighting techniques, the mass can be reduced by changing the solid mirror blank 450 into a combination of solid material and empty regions. The techniques for generating empty regions or reducing mass while maintaining support for the precise optical surface is what distinguishes the areal density across the various designs. The degree of light weighting, the stiffness to weight ratio, the first mode resonant frequency, and the surface figure profile over a temperature range are just some parameters that distinguish these designs from each other.

Illustrated in FIG. 6*b*, U.S. Pat. No. 6,598,984 B2, R. Reitz and R. Dahl show that removing material in the non-axial direction is good way to reduce mass. Precise optical surface 650 has remained unchanged; however, empty regions in the once solid block now provide some degree of light weighting.

FIG. 6*c* shows what could result from a pocket milling process where material is removed from the axial direction by abrasive water jet.

Now, instead of a solid mirror blank 450, FIG. 6*d* shows how mirror blank 450 has become an assembly of components. We will refer to the aggregate of parts supporting the precise optical surface 650 as the mirror blank assembly 500. In FIG. 6*d*, the components are comprised of a front face sheet 20, a back face sheet 30, and struts 300.

Once the mirror blank assembly 500 components have been bonded together, the degree of light weighting is a simple ratio of mass to area, typically measured in $kg/m^2$. In 1983, the Hubble Space Telescope primary mirror was designed and constructed to be 180 $kg/m^2$. The Eastman Kodak Company Advanced Mirror System Demonstrator mirror yielded next generation segmented primary mirror prototypes at 15 $kg/m^2$. Future programs have demanded even lower areal densities. This demand has made innovative light weighting techniques a valuable system trade off.

Different inventors have suggested various methods of light weighting mirror blanks. One approach takes a high quality front plate and attaches it to a foam core. For mechanical stiffness, a back plate was usually added to the rear of the foam core. U.S. Pat. No. 4,670,338 issued Jun. 2, 1987 to Alain Clemino and titled "Mirror Foamed Glass Substrate And Method Of Manufacture" discloses a series of foamed blocks glued together and then attached to face sheets. In U.S. Pat. No. 5,208,704 issued May 4, 1993 to Richard R. Zito and titled "Ultralight Mirrors," a fibrous substrate made from silica and alumina fibers was sealed and subsequently coated with a slurry glaze. The coefficients of thermal expansion (CTE's) were matched to prevent warping. Tatsumasa Nakamura, et al. disclose in U.S. Pat. No. 5,316,564 issued May 31, 1994, and entitled "Method For Preparing The Base Body Of A Reflecting Mirror," a process to fuse a thin plate to foamed silica using a silicon-rubber curing agent. Nakamura, et al. also disclosed fusing the thin plate using fine glass powder. In U.S. Pat. No. 5,640,282 issued Jun. 17, 1997 to Yoshiaki Ise, et al., and entitled "Base Body of Reflecting Mirror And Method for Preparing the Same," the inventors disclose attaching a high-quality plate to a porous substrate using silica powders. Claude L. Davis, Jr., et al. (U.S. Pat. No. 6,176,588, issued Jan. 23, 2001, and entitled "Low Cost Light Weight Mirror Blank") show an optical surface attached to extruded ceramic honeycomb (e.g., Corning's CELCOR®) with room temperature vulcanizing silicon. These approaches all use adhesives that have slightly different CTE's. Also, the bonding materials are hydroscopic and can change dimensions with humidity.

A second approach is described in U.S. Pat. No. 3,713,728, issued Jan. 30, 1973 to Lewis M. Austin, et al.; whereby molten glass is poured around small refractories. The refractories (e.g., Glasrock Foam No. 25) were supported by pins. Later, the refractories were removed. This process resulted in a dimensionally stable mirror blank, however, the degree of light weighting with this process is limited since the walls between the refractories need to the be thick enough to let the molten glass flow between the refractories. FIG. 6*c* shows the resulting shape for such a process.

In a third approach, a core structure is built up from thin struts and face sheets are attached to the strut structure. U.S. Pat. No. 4,917,934, issued Apr. 17, 1990 to Daniel R. Sempolinski, and entitled "Telescope Mirror Blank and Method of Production" discloses a strut assembly with frit bonding and then bonds the assembly to face plates with frit bondings or tape cast strips. These frit bonds are subject to moisture absorption. Also, struts tend to sag when heated, unless the struts are thick. Thick struts will limit the degree of possible light-weighting. Phillip R. Martineau, in U.S. Pat. No. 6,045, 231, issued Apr. 4, 2000, and entitled "Open Core Light- Weight Telescope Mirror And Method of Manufacture" disclosed front and back plates fused to a strut structure by fusing the plates at the softening point. The strut structure is open to the outside diameter, eliminating the need for vent holes. Concerns remain that this design suffers from stability problems especially when the optic is mounted in a trunion or tip/tilt mount. Additionally, strut thickness will limited the degree of light-weighting. FIG. 6*d* shows what a strut design would look like, independent of the bonding method.

The Hextek Company has successfully made mirrors using their GAS-FUSION® process. In this process, borosilicate glass tubes are pressurized while the tubes are heated between face sheets. The tubes are pressed into a hexagonal close-pack geometry. The temperature is reduced and the pressure is reduced. The result is an 85% light-weight core. While this process yields a structurally sound blank, the industry is now demanding still lighter mirrors. The degree of light-weight is limited by the cells supplying enough structural support after heating and before inflating. Cells too thin will sag after heating.

Russian Patent No. 739458 from Derevensky, et. al. shows closed tubes with spherical bulges. The inventors disclose arranging the tubes such that the spherical regions are in a close-packed orientation, however, the tube arrangement is not maximally dense. The parts are fabricated from sealed tubes. Regions along each tube are heated and blown. Each tube needs to be a custom length and while there may be sets of equal lengths, tubes cannot be fabricated until the overall mirror blank dimensions are known.

Located on the Internet at www.kodak.com, Eastman Kodak Company combined the core structure approach with a low temperature fusion (LTF) process to make several mirrors. The core structure is cut from a solid blank using an abrasive water jet (AWJ) tool. The face sheets are fused to the polished core structure and a back plate is added. However, the LTF process may still be improved upon to reduce manufacturing time and process costs. This design is also a strut construction depicted in FIG. 6*d*.

References to corrugated glass can be found in the public domain. For example Joel Berman Glass Studios Ltd., Vancouver, British Columbia, Canada shows a one-dimensional corrugation in either the long or short direction. The C&P Lighting Company, Ltd, Bangkok, Thailand describes a lighting fixture for outdoor lighting that features a "corrugated glass dome." The Visa Lighting Company of Milwaukee, Wis. carries the Easel line of light diffusers with the "corrugated glass diffuser" option.

In U.S. Pat. No. 3,112,184 R. Hollenbach generated a corrugated carrier with a crimping tool. Later he coated this corrugated structure with ceramic material. Once coated the carrier and unfired material was passed through a furnace. The resulting structure was bonded and cured. The inventor suggests inorganic carriers such as aluminum foil, tea bag paper, nylon cloth, rayon cloth, and polyethylene film. The ceramic materials include the glasses, such as boro-silicates, soda-lime-silicates, lead-silicates, alumino-silicates, etc. The structures resulting from the light-weight ceramic shapes show a one-dimensional corrugation but he mentions more "complex repeating patterns." Hollenbach discloses using corrugated structures for protecting high-speed projectiles from heat and friction, thereby forming a thermo-barrier. Additionally, Hollenbach teaches stacking the corrugated structures.

In U.S. Pat. No. 3,272,686 by the same company, the honeycomb structures are assembled with flux that match the coefficient of thermal expansion (CTE). The bond is commonly called a frit and is subject to moisture absorption and slow shape change. Again, a corrugated structure is used for insulation and protection against thermal heat.

Many techniques use an assembly of components to build a structure from small thin parts and then bond a face sheet to these components. The face sheet subsequently becomes the precise optical surface. FIG. 6*d* shows how struts 300, form grill-like support structure for front face sheet 20. Several structures, such as theses, have been mentioned as prior art.

In these aforementioned mirror blank fabrication processes, a supplier requires custom tooling and significant time to build the mirror blank to specification. The costs for tooling, material, and process steps can be prohibitive. Therefore, there exists a need for a method of construction for precise mirror blanks that does not incur such drawbacks and adequately supports the precise optical surface 650. The present invention reduces the fabrication time from tens of months to tens of hours. The areal densities from this process are less than what current technology has recently produced. The costs for this new process are significantly less than current methods. As a result, the risks associated with finishing the mirror blank assembly, have been greatly reduced since fewer resources were required to produce the mirror blank assembly.

SUMMARY OF THE INVENTION

The present invention is directed to overcoming one or more of the problems set forth above by providing a light-weight mirror blank assembly, having at least one sheet of corrugated material; and at least one face sheet in intimate contact with a surface of the sheet of corrugated material forming the light-weight mirror blank assembly. The light-weight mirror blank assembly has an areal density less than an equivalent blank assembly having a solid support structure for supporting a mirrored surface.

ADVANTAGES

The present invention also has the following advantages:

Only the material required for the mirror blank is used. In contrast, one conventional process removes more than 95% of the material from a solid blank, leaving a cell or strut structure.

The mirror core may be fabricated before the finished mirror shape is known, thereby reducing the time required for mirror blank fabrication.

This process is capable of producing mirror blanks whose areal densities are less than 10 kg/m$^2$.

The mirror blank fabrication process can be part of near net shape face sheet slumping or precision molding process, where the face sheet and blank are generated at the same time.

This process does not use any adhesives, bonding layers, or silica powders and is constructed from only one material.

This process is not subject to moisture absorption or adsorption problems.

The resulting core is mechanically very strong, stable, and stiff.

In the fused state, the core has extremely few reentrant angles and points for stress concentration.

The core can be made from a single piece of material and can be inspected before fusing it to face sheets.

The core material has polished surfaces and therefore contains no subsurface damage.

The mirror blank is made from a minimum number (2) of components.

The fabrication risks associated with this technique are reduced because less labor and material is required.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

To facilitate understanding, identical reference numerals have been used, where possible, to designate identical elements that are common to the figures.

DETAILED DESCRIPTION OF THE INVENTION

An improved method for fabricating low cost, short fabrication time, and light-weight mirror blanks, is provided. The present invention provides a method for assembling a plurality of glass pieces together to form light-weight mirror blanks. In industry, these light-weight mirror blanks are referred to as having a light-weight core. These mirror blanks have areal densities below that of a solid mirror blank of the same shape. The light-weight mirror blank assembly is basically a glass structure with a minimum of two pieces of glass fused or attached together. Assembly of the light-weight mirror blanks includes a gathering all necessary components (described later in FIG. 1), and initiating a heating process to produce the light-weight mirror blank assemblies in about 12 hours, thereby significantly reducing cycle times.

Figure 5A:
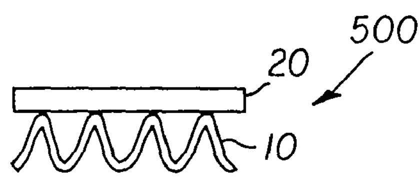
FIG. 5*a-r* shows several exemplary embodiments of corrugated glass structures supporting precision optical face sheets.

Regarding the present invention described, herein, the mirror core is the part of the mirror blank assembly that contains the light-weight structure. Referring to FIGS. 5*a-r*, the front face sheet 20 is the part of the mirror blank assembly 500 that will eventually be the precise optical surface 650 following finishing process steps such as polishing, figuring, and coating. Finally, other parts may be added to the mirror blank assembly 500 to enhance the support for the precise optical surface.

The material, from which a mirror blank assembly may be constructed, depends on the mirror application and environment. For ground-based telescopes, borosilicates, have good thermal conductivity and will come to thermal equilibrium quickly. For space-based applications, differences between sun and shade result in large temperature swings so materials with low coefficients of thermal expansion are required. Russian Astro Sital®, Schott Zerodur®, and Corning ULE® are examples of suitable materials. For deep-space looking telescopes, beryllium is well suited to cryogenic temperatures. Depending on the material choice, the process for constructing the components may change. While the present invention is described with glass in mind, it is not restricted to glass components. For example, thin metal components may be electroformed into corrugations and glass-ceramics may be fired from a glass state into a ceramic state. Light weighting mirror blank assemblies with corrugations may be constructed with a variety of materials.

FIGS. 5*a-r* show a series of embodiments with corrugated cores 10 supporting front face sheets 20. Depending on the materials chosen for the corrugated core 10 and front face sheet 20, the method of attaching these two components, and alternatively subsequent components, will vary. Prior art has shown that for glass and glass-ceramic structures, a plurality of methods for bonding exist. Some methods are preferred over others. Assume for discussion purposes only, that the geometries shown in FIGS. 5*a-r* are glass structures and they have been assembled by a high temperature fusion process.

FIG. 5*a* shows the simplest and most basic design, consisting of 2 components. A corrugated core 10 is bonded to and supports a front face sheet 20 to form a mirror blank assembly 500. The corrugated core 10, adds stiffness to the thin front face sheet 20. Typical front face sheets 20 are initially thick and once bonded to the corrugated core 10, are shaped, ground, and polished to precise optical surfaces. The front face sheet 20 desired thickness, is adjusted during the shaping process. The process for fabricating the corrugated core 10 is material dependent however discussed later is one method for molding corrugated cores 10 from glass plates 100. Depending on the number of mirror blank assemblies 500 required, the process for corrugated core 10 fabrication will change. In other exemplary embodiments, identical elements are numbered identically for consistency and ease of understanding.

Figure 5B:
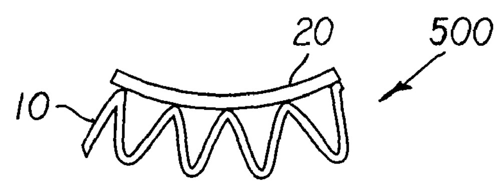

FIG. 5*b* illustrates that a curved front face sheet 20 is supported with a curved corrugated core 10. A corrugated core 10 and front face sheet 20 are shaped to a required curve prior to their assembly. Alternatively the mirror blank assembly 500 in FIG. 5*a* may be shaped after the corrugated core 10 and front face sheet 20 are bonded. The shaping then results in FIG. 5*b*. One typical method of doing this is slumping.

Figure 5C:
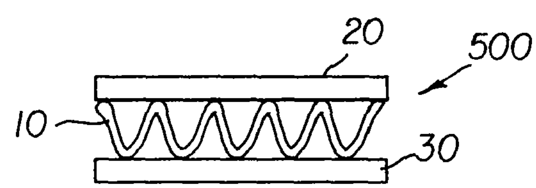

The design in FIG. 5*c* is an improvement over the design in FIG. 5*a*. At the cost of increased areal density, a back face sheet 30 was added. Back face sheet 30 increases the mirror blank assembly 500 stiffness and first mode resonant frequency. Additionally, it more evenly distributes side loads to the part. Back face sheet 30 also facilitates blocking the mirror blank assembly 500 for grinding and polishing operations and it also facilitates final mounting to a support/positioning structure (not shown).

Figure 5D:
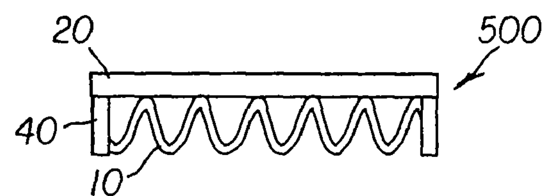

The FIG. 5*d* design is an improvement over the design in FIG. 5*a* as well. At the cost of increased areal density, an edge ring 40 was added to stiffen mirror blank assembly 500 as well as providing uniform support to the front face sheet 20. Additionally, edge ring 40 provides a way to hold mirror blank assembly 500 from the edge instead of from the back face sheet 30. Edge ring 40 can be constructed from tubing or by bonding a single strip of material in a hoop configuration. The exterior shape to edge ring 40 is not restricted to a circular cylinder but alternatively be any curve either a connected closed curve or unconnected. The edge ring 40 also serves to protect the front and back face sheets 20 and 30 respectively, as well as adding addition support to the very edge of both face sheets.

Figure 5E:
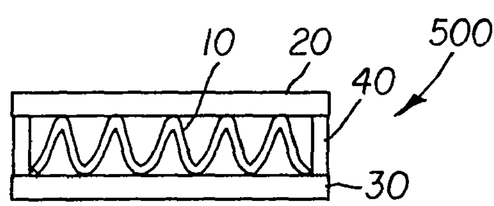
Figure 5F:
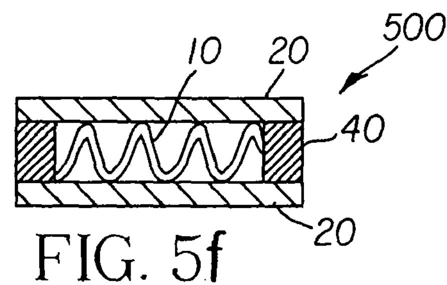

FIG. 5*e* shows that design improvement from FIGS. 5*c* and 5*d* are simultaneously incorporated into a design again at the expense of increasing the areal density. The handling and mounting advantages described previously apply. Additionally, the mirror blank assembly 500 core (previously defined) is completely sealed. This helps keep the mirror core clean and free from grinding and polishing compounds. In FIG. 5*f* the same basic design applies however, the edge ring 40 thickness was increased significantly. This design offers a region, outside the mirror blank assembly 500 clear aperture, where the tolerances on the precise optical surface are relaxed only because later, this extra region is cut away. This design offers ways to small tool polish past the clear aperture.

Figure 5G:
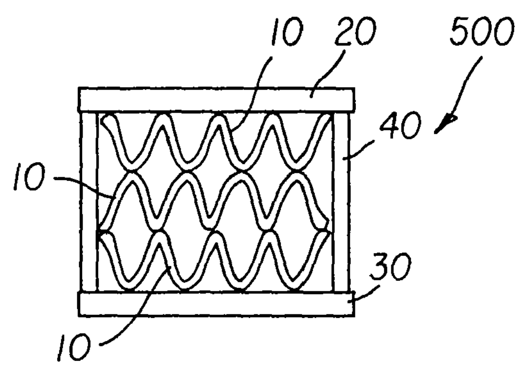
Figure 5H:
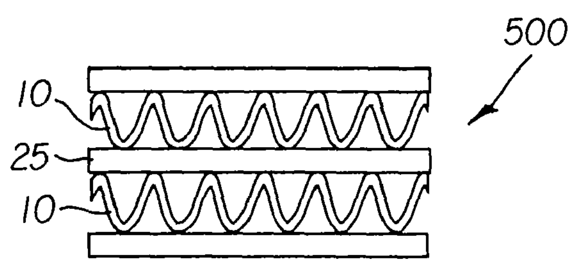

FIG. 5*g* illustrates the plurality of corrugated core 10 pieces may be interleaved with inter layer plate 25. This then increases the overall mirror blank assembly 500 thickness. A thicker mirror core results in a stiffer mirror blank assembly. FIG. 5*h* shows how a plurality of corrugated core 10 pieces may be stacked to give a thicker mirror blank assembly 500. The methods used in FIGS. 5*g* and 5*h* may be combined.

Figure 5I:
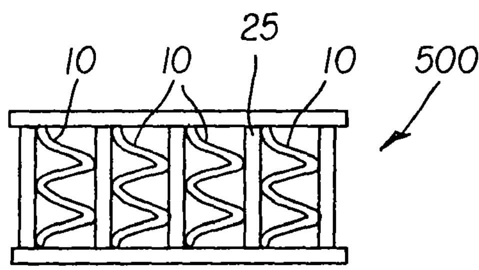

FIG. 5*i* shows that if the corrugated core 10 and interlayer plate 25 are rotated by 90 degrees, the results are corrugated struts. For very large mirrors, where the diameter is more than 10 times the corrugate core 10 peak-to-valleys, this designs this approach would significantly stiffen the mirror blank assembly 500.

Figure 5J:
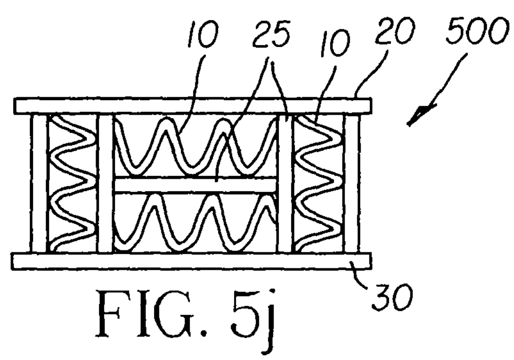
Figure 5K:
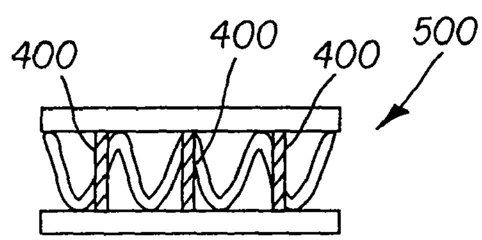
Figure 5L:
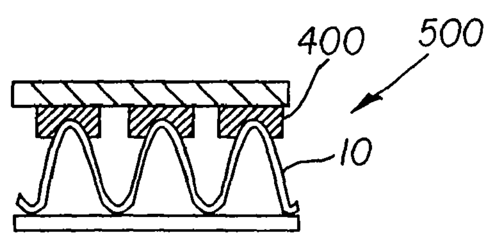
Figure 6A:
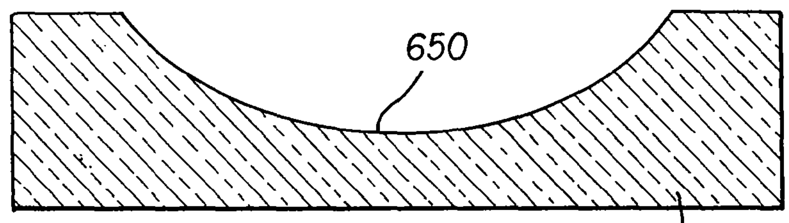
FIG. 6*a*-6*d* shows examples of prior art.
Figure 6B:
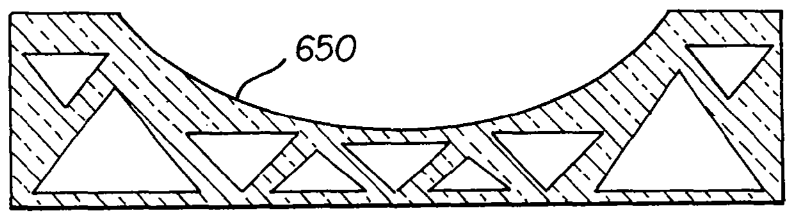
Figure 6C:
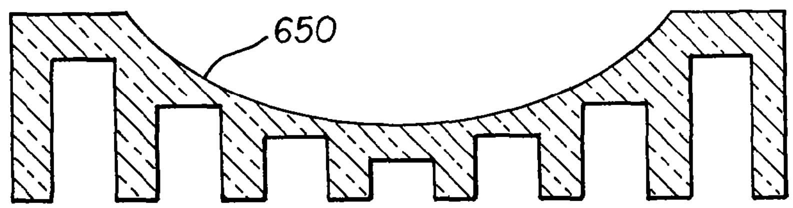
Figure 6D:
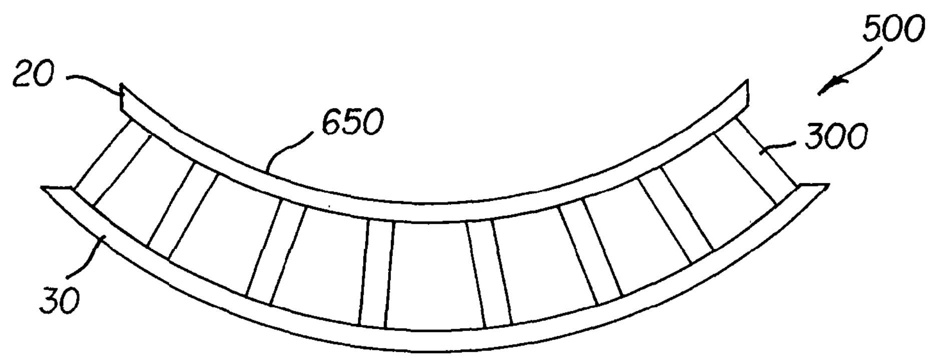

FIG. 5*j* demonstrates the orientations may be combined to give extra stiffness to regions of the mirror blank assembly 500. This would typically be done where mounting pads are required. In FIG. 5*k* the reinforced mounting regions could be a reinforcing post 410 that pass through the corrugated core 10. Other configurations for reinforcing regions (such as extra support material are added to regions of the core that may experience more stress or tension) are possible as demonstrated in FIG. 5*i*. In FIG. 5*i*, the mounting region was reinforced when corrugate core 10 was molded.

FIG. 5*k* also suggests that the mirror blank assembly 500 areal density may be further reduced by modifying corrugated core 10. Holes in corrugate core 10, if not used to provide clearance for reinforcing post 410, can be used to further reduce the corrugate core 10 mass. Removing mass from the corrugated core 10 can be done either before or after molding. The optimal shape for the holes is dependent on the corrugation pattern.

FIG. 5*m* shows that a plurality of individual corrugated cores 10 to support larger diameter face sheets 20 and 30 during manufacturing; this would reduce tooling costs.

FIG. 5*n* shows that the corrugated core 10 can absorb the difference between the front face sheet 20 curve and the back face sheet 30 curve. While shown without an edge ring 40, this design does not preclude one. FIG. 5*o* shows how an edge ring 40 is not required to seal the mirror core. The front face sheet 20 and back face sheet 30 have been crimped together.

The mirror blank assembly 500 in FIG. 5*q* shows that front face sheet 20, back face sheet 30, and corrugated core 10 are curved. The curves may be generated prior to assembly, during assembly and fusion or, alternatively, in a secondary process where a piano mirror blank assembly 500 is slumped. If the components are curved prior to assembly, the face sheets may be formed by molding the glass plate 100 between refractory mandrels (not shown) or supported with a hoop and slumped (not shown). The corrugated core may be slumped after molding or by modifying upper corrugate mold 70 and lower corrugated mold 80 of in FIGS. 8*a*, 8*b*, 9*a*, and 9*b*. A suitable curved may be added to the upper corrugate mold 70 and lower corrugated mold 80.

As the designs for mirror cores become more intricate, the point where the mirror core ends and the finished mirror assembly support structure begins becomes more ill-defined. FIG. 5*p* shows, by way of example, how a mirror blank solid may be supported and stiffened using a mirror blank assembly 500 design incorporating a corrugated core 10. Additionally, in FIG. 5*r* the secondary mirror is supported with corrugated core 10 structures. The light path 350 is shown entering from the left, striking the concave precise optical surface 650, and reflecting toward the convex precise optical surface 650 on the secondary mirror 430. The light path 350 continues through a hole in the concave precise optical surface 650.

The mirror blank assemblies 500 in FIG. 5*r* support the precise optical surfaces 650. Previous corrugated glass structures, discussed in prior art, were used as thermal barriers and did not support precision face sheets either directly or indirectly. Thus, the corrugated core 10 serves as a support structure during mounting and as a holding structure to minimize precise optical surface 650 distortion. This is novel over using corrugated glass as merely thermal barriers.

Figure 7A:
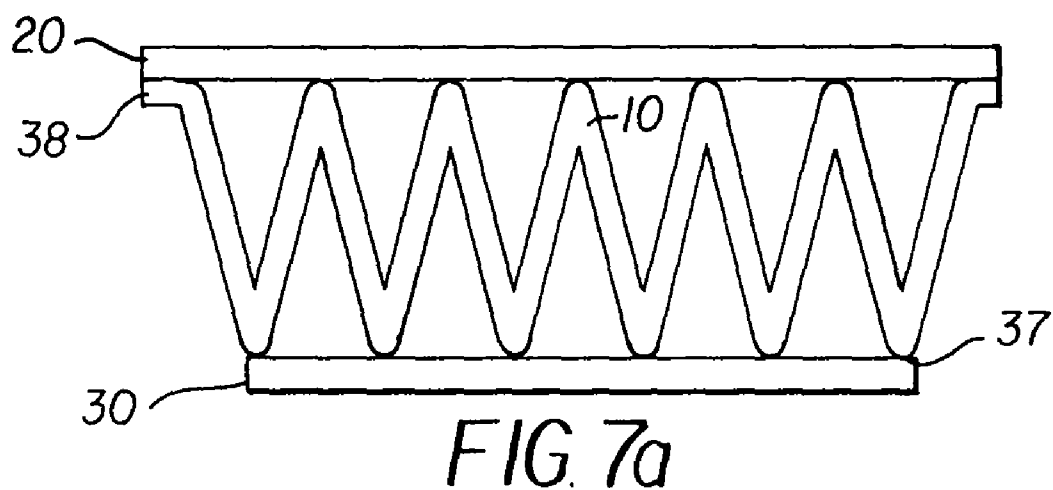
FIG. 7*a* shows a two dimensional view of a mirror blank assembly where the corrugated glass core was molded to provide a continuous ring mounting surface for the front and back face sheets.
Figure 7B:
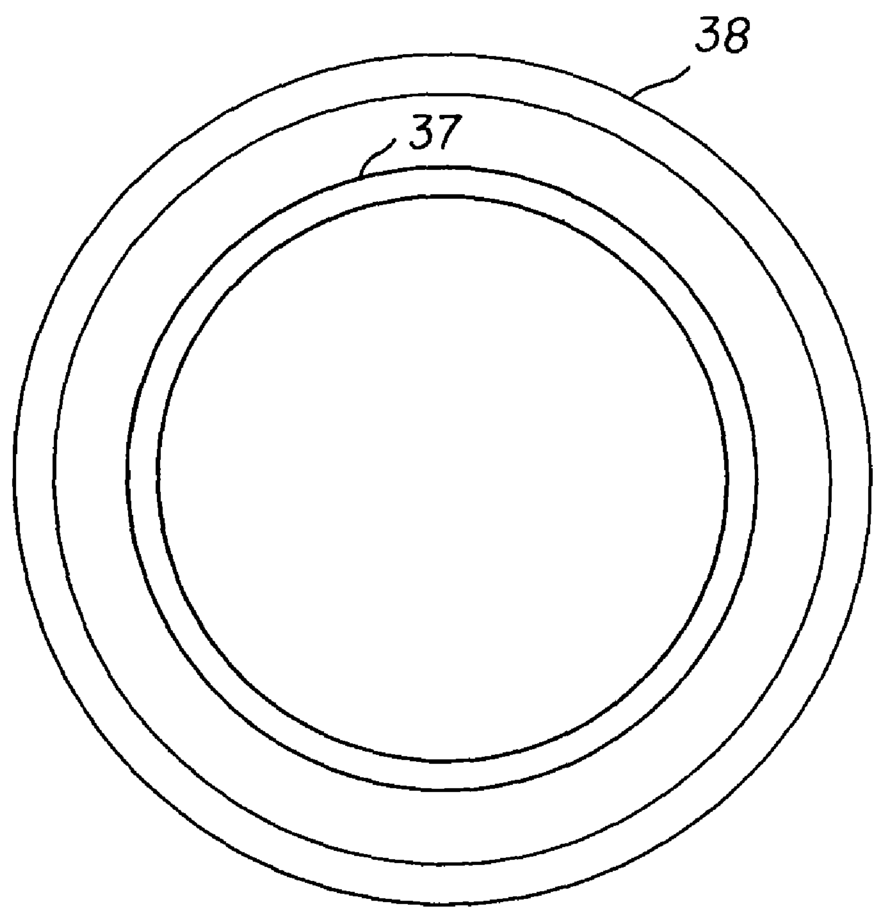
FIG. 7*b* shows the mirror blank assembly top view described in FIG. 7*a* where the mounting surfaces are more clearly seen.

Another novel exemplary embodiment is shown in FIG. 7*a*-7*b*. Referring to FIG. 7*a*, a two-dimensional view shows the corrugated core 10 and the edge ring 40 as an integrated piece. The perimeter of corrugated core 10 is attached to face sheet 20 at the outer continuous bonding region 38. Face sheet 30 is attached to back face sheet 30 at the inner continuous bonding region 37. The inner continuous bonding region 37 and outer continuous bonding region 38 were formed by double bending the core material. As shown in FIG. 7*b*, the continuous bonding region 37 is a continuous closed curve, thus sealing the core region interior from the outside environment. Additionally, the perimeter to corrugated core 10 is now supported thus reducing vibration. Excess face sheet material may be trimmed so that no flanges result, further improving the design. Back face sheet 30 must be smaller that front face sheet 10 in this configuration.

Figure 1:
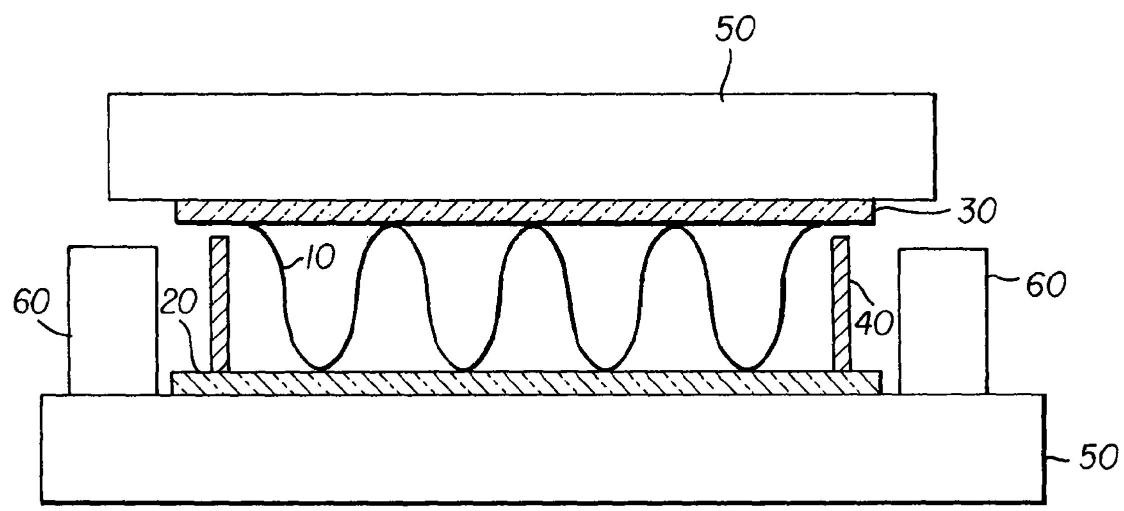
FIG. 1 is an assembly drawing of the four glass components prior to fusion.

As discussed earlier, high temperature fusing the components together is one method of assembly. FIG. 1 is supplied to illustrate how this could be done. A front face sheet 20 was positioned under a corrugated core 10. For illustration purposes, the corrugated core 10 is shown as a simple corrugation in one direction. One embodiment for the core 10 is a complicated three dimensional surface described later. In the final assembly the core 10 must support the front face sheet 20 in a way that distributes the loads on the face sheet during subsequent processing and later mounting.

Also in FIG. 1, a back face sheet 30 is shown and, while not essential, it is preferred for added strength, rigidity, stiffness, and front face sheet 10 support. The edge ring 40 is also not essential but also preferred for cleaning, handling, and mounting reasons. Additionally the edge ring 40 and back face sheet 30 permit an additional and useful fusion process step. The parts described thus far are assembled on a suitable refractory mass 50. Examples of suitable materials include but are not restricted to graphites, kiln plates, fire bricks, vitreous carbon, and alumina. A smooth surface on refractory mass 50 is desirable. Those skilled in the art of glass molding will realize that imparting a particular optical shape to front face sheet 20, by choosing an appropriate desired shape to refractory mass 50, will be possible and very advantageous.

FIG. 1 shows the corrugated core 10 extending past the edge ring 40 so that a small gap between the front face sheet 20 and edge ring 40 results. For a high temperature fusion process, the unfused mirror blank assembly 499 is heated to a temperature where the components will stick and begin to sag. During the fusion process, the tops to the corrugated core 10 will bond with the front face sheets 20 and back face sheet 30. As the materials join and fuse, the overall spacing between the two face sheets will decrease and the front face sheet 20 will contact edge ring 40.

During fusion, edge ring 40 and refractory blocks 60 will catch and limit the total compression. Depending on the refractory block 60 height, the amount of edge ring 40 compression can be adjusted. Alternatively, edge ring 40 could be taller than corrugated core 10. In this case, edge ring 40 would need to compress before the back face sheet 30 would engage the corrugated core 10.

The high temperature fusion process consists of a temperature ramp to just below the annealing temperature. The components then soak for a minimum of 30 minutes, so they may all reach the same temperature. The final ramp to the optimum molding temperature tracks closer to the control temperature when the part starts at an elevated temperature. We molded silica glass at a viscosity of about 8.75 Log Poise; however, viscosity and time may be adjusted with substantial latitude. For example, we have also molded borosilicate glass around 10.5 Log Poise.

If the process runs cooler, the edge ring 40 will compress less however, compression at the corrugated core 10 to the front face sheet 20 and back face sheet 30 will be less as well. The amount of edge ring 40 compression can also be controlled with the edge ring 40 wall thickness. Thicker walls offer more resistance and greater support.

Toward the end of the final heating ramp, the back face sheet 30 fuses to the edge ring 40. When this occurs, a relative pressure difference between the internal mirror blank cavity and the external heating environment will cause the mirror blank to exert force against the refractory masses 50. If left unchecked, this extra force can cause severe dimpling in the mirror blank surface as the front face sheet 20 and back face sheet 30 stretch away from each other and the corrugated core 10 restrains this motion. When the edge ring 40 fuses to the face sheets 20 and 30, and if the fusion causes a sealed cavity to form, additional heat will generate a pressure difference.

By adjusting the maximum temperature close to the point at which the fusion occurs, the pressure can be used advantageously. Only a small pressure differential will result if the maximum temperature does not deviate more than 10 or 20° C. Cooling back past the strain point will then hold the glass in a final shape.

If the heating environment has pressure control, the pressure inside the mirror blank assembly and the heating environment pressure should be adjusted so that the two are nearly equal. A slight force pushing the back face sheet 30 outward will help minimize sagging and quilting on the back face sheet 30. The pressure difference is not required and can be difficult to control. If the effects from the pressure differential are unwanted, a small hole or groove in edge ring 40, prior to assembly, will ensure no pressure builds up.

The cooling step should include an annealing time where the residual stresses in the mirror blank may be relieved. In a pressure controlled heating environment the cool down cycle will also include ambient pressure reduction at a rate that will result in a slight outward force. Additionally, the temperature must be controlled until it is below the annealing temperature. Temperature control will help keep the parts from expanding or imploding during the descent to the annealing temperature.

To ready the blank for subsequent grinding, polishing, and eventual flight, the core must be vented to ambient conditions. Failure to do this will result in quilting or dimpling that changes with ambient pressure. A small hole may be drilled in the edge ring 40 to allow the pressure in the blank to equalize with the surroundings. If done prior to assembly and fusion, this hole should still be open.

The corrugated core 10 is a key feature in this light-weight mirror blank. Before molding a corrugate core 10, a polished glass plate 100 is used as the starting material and shown in FIG. 4. As mentioned before, the corrugation material will change the process needed to fabricate corrugated cores 10. In previous designs, core materials were unpolished because they were cut using abrasive methods. Abrasive cutting techniques leave subsurface damage and are more likely to crack. Therefore, a polished surface is stronger member than an equivalent ground surface. Using a polished corrugate core 10 is preferred to a ground surface for several reasons. The corrugated core 10 is free from subsurface damage; it will adhere to the front face sheet 20 and back face sheet 30 better when polished; it will facilitate inspection.

Figure 2:
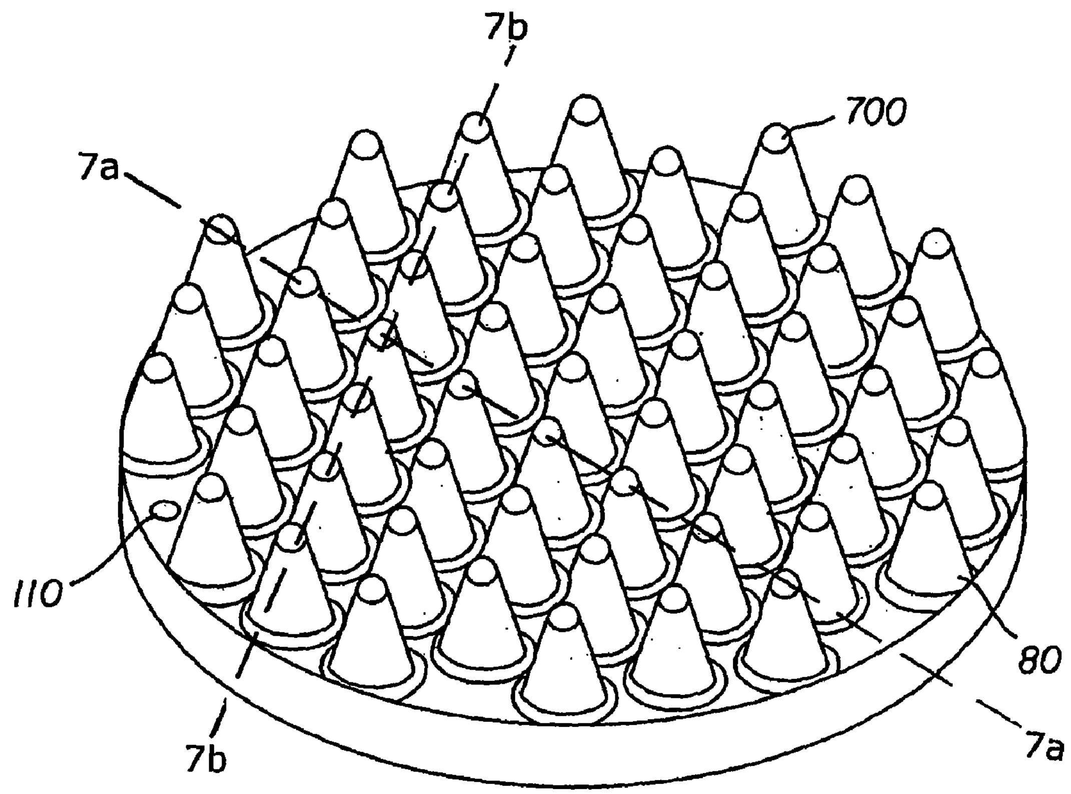
FIG. 2 is a perspective view of the refractory mold.
Figure 3:
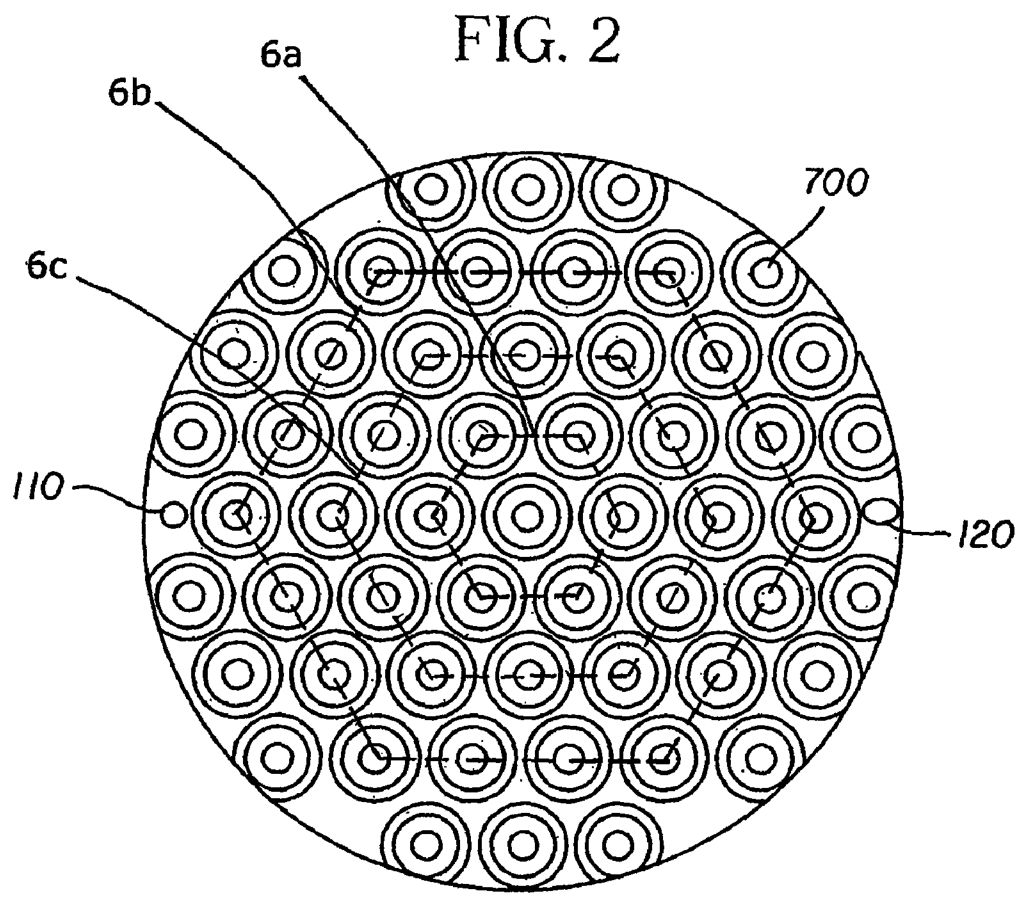
FIG. 3 is a shaded top view to the refractory mold.
Figure 4:
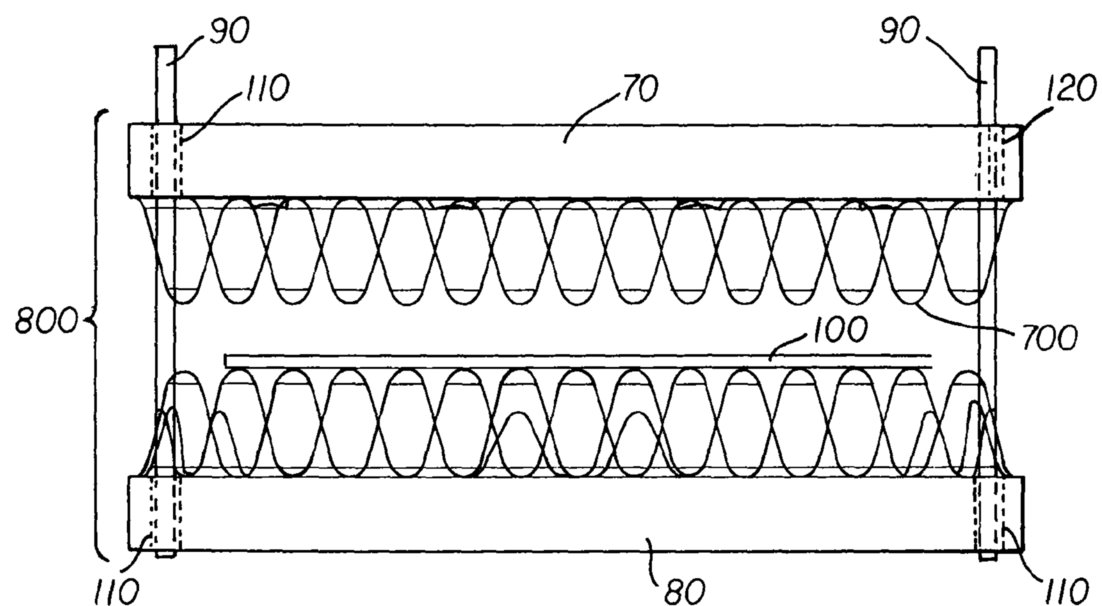
FIG. 4 is an assembly drawing for the process to fabricate the corrugated glass core.

Methods to generate corrugated cores 10 are not explicitly described in the public domain. Those skilled in the art of glass molding could, with a minimum of experimentation, determine a process. FIGS. 2, 3 and 4 show a lattice of refractory cones 700 on a plate. As the glass plate 100 that forms the corrugated core 10 is heated, the glass plate 100 will begin to deform. The molding action continues until the upper corrugated mold 70 traps glass plate 100 against the lower corrugated mold 80.

The mold design shown in FIGS. 2 and 3 is such that the cone-shaped peaks are located on the corners of a regular hexagon (for example regular hexagons 6*a*, 6*b* and 6*c*) with one extra peak located at the center of a regular hexagon, such as hexagon 6*a*. This pattern is then replicated over the plate and sufficient to cover the desired region. The mating part to the mold is the same pattern, shifted such that the peaks on one mold half align to the regions between the peaks of the second mold half.

Other mold patterns are possible. For example a sin(x)*sin(y) pattern would also generate a two dimensional peak and valley array but the peaks would be on the corners of a square. The regular hexagonal pattern is preferred for distributing forces evenly.

FIG. 4 shows a side view of a mold assembly 800 ready to close. Mold alignment is achieved with an alignment hole 110 and an alignment slot 120 in one half of the lower corrugated mold 80 and two alignment holes 110 in the upper corrugated mold 70. The corrugated mold halves 70 and 80 are aligned so that the peaks of one half are positioned above the valleys on the other half. Using mold halves 70 and 80, each having the design pattern shown in FIG. 2, with transversely oriented cross-section lines 7*a*-7*a* and 7*b*-7*b*, the resulting corrugated core 10 forms transversely oriented cross-sections of first and second “sine wave like” configurations.

The mold halves, upper corrugated mold 70 and lower corrugated mold 80 are held together with refractory alignment pins 90. These alignment pins 90 maintain the mold alignment during the molding process. As heat is applied and the glass plate 100 softens, the upper corrugated mold 70 is free to move vertically on the alignment pins 90. The alignment hole 110, alignment slot 120, and alignment pin 90 all work to restrict the clocking error and maintain the desired alignment. The fit between alignment pins 90 and alignment holes 110 or alignment slot 120 allows gravity to act as the molding force while permitting corrugated mold 70 to slide freely on alignment pins 90. Additional force may be brought to bear on glass plate 100 by adding mass onto upper corrugate mold 70. This would permit molding at a lower temperature and higher glass plate 100 viscosity.

By aligning an array of refractory cones 700 on the surface of a sphere rather than a plane, the resulting corrugated core 10 can have a curved shape. This would facilitate fusing the curved face sheets 20 and 30 to the corrugated core 10. See FIG. 5*q* for an example of where the curved corrugate core 10 would be needed.

During the heating cycle, temperatures giving a silica glass plate 100 viscosity of about 8.75 Log Poise are used. If a pressure controlled heating environment is available, good adhesion to the refractory mold can be accomplished by adding a vacuum cycle during heating ramp up. Then, during the peak temperature hold cycle the pressure can be changed from vacuum to pressure to help the glass plate 100 mold to the corrugated mold surfaces 70 and 80.

If the mold is similar to the one shown in FIG. 4, the outer perimeter to the corrugated core 10 will no longer be circular once it has been molded. As the glass plate 100 molds into the corrugation, the edges will distort by the projection of the mold onto a flat surface and by the glass differentially stretching. We used a diamond belt-sander to round corrugated core 10 into a circular shape. Other methods, such as abrasive water jet and laser cutting, are possible.

FIG. 4 shows a mold for generating the corrugated core 10. Refractory cones 700 are features on the upper corrugated mold 70 and lower corrugated mold 80. The refractory cone 700 height is specific to the mirror blank design. Refractory cone 700 positioning is application dependent however. The examples were generated with a pattern of refractory cones 700 located at the vertices of a regular hexagon and at the regular hexagon centroid.

Alignment pins 90 slide through the upper and lower corrugated molds 70 and 80, through an alignment hole 110 and alignment slot 120, forcing the mold halves to be in registration. Between upper and lower corrugated molds 70 and 80, a glass plate 100 is trapped. As the mold assembly 800 in FIG. 4 is heated and glass plate 100 begins to deform, upper corrugated mold 70 will slide down on the alignment pins 90. After full press-out the molded corrugated core 10 will be between a corrugated mold 70 or 80 and a refractory cones 700.

Figure 8A:
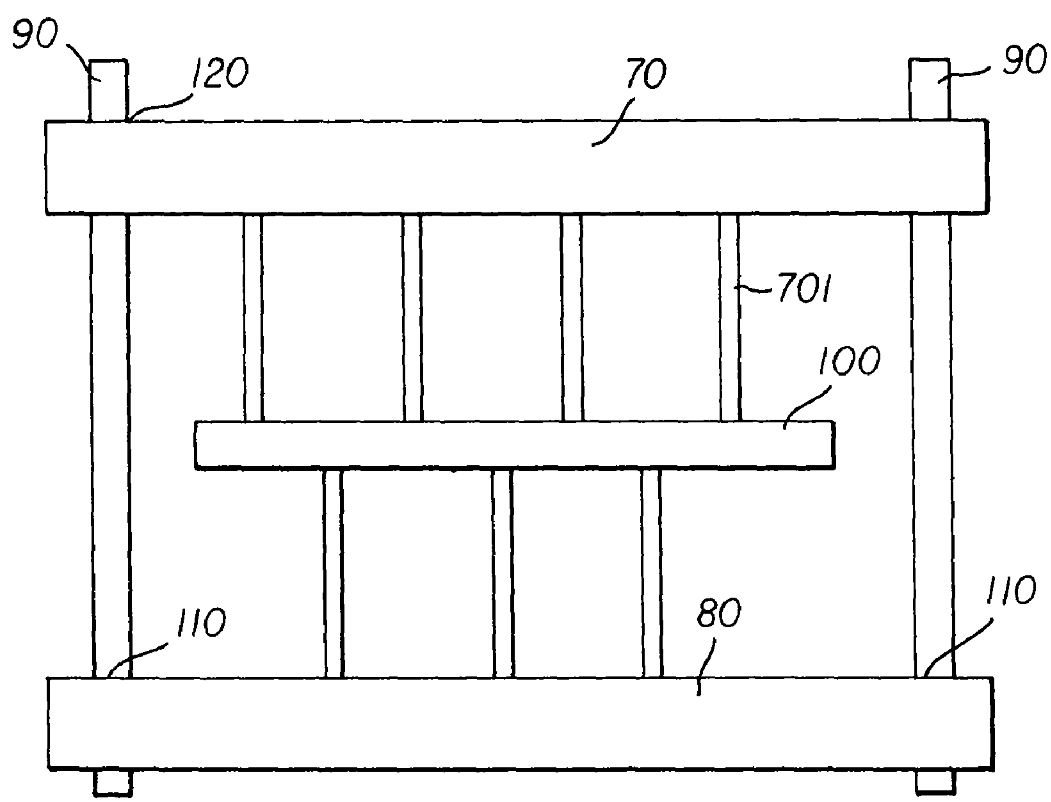
FIG. 8*a*-8*b* shows a mold design both before (FIG. 8*a*) and after (FIG. 8*b*) molding.
Figure 8B:
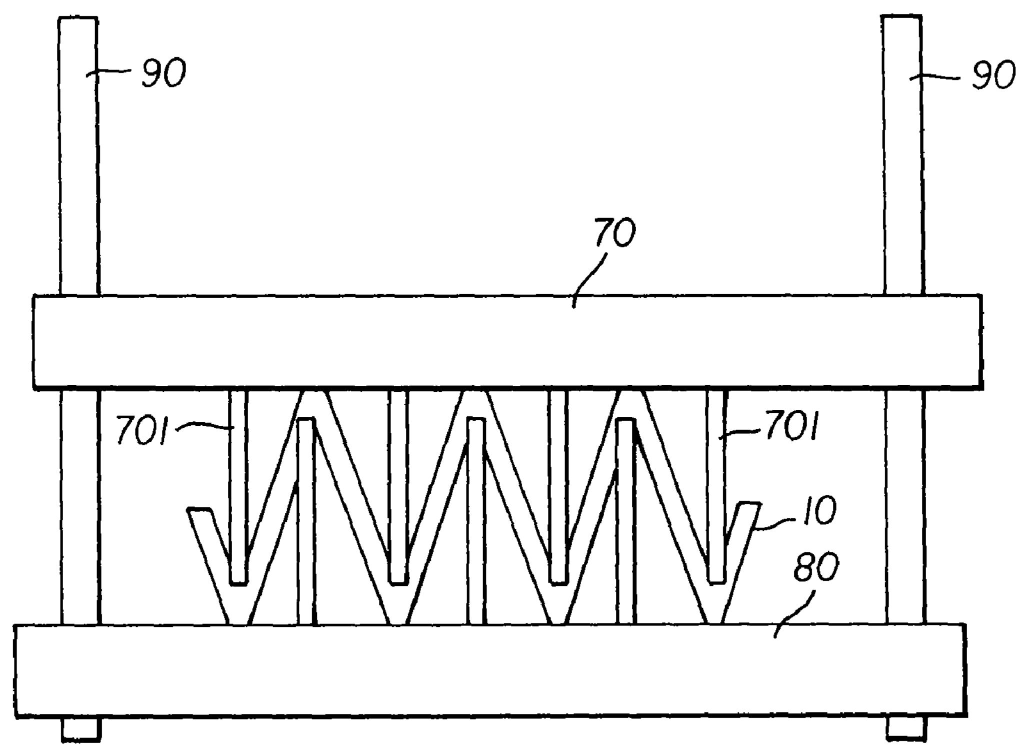

Alternatively, FIGS. 8*a* and FIG. 8*b* show that refractory cones 700 may be replaced with molding pegs 701. For good mold release and to eliminated reentrant angles in the corrugated core 10, the molding pegs 701 should be rounded and tapered. Molding pegs 701 can be inserts to upper corrugated molds 70 and 80 resulting in a less expensive mold design. Additionally, corrugated mold 70 and 80 may be curved (not shown) where the corrugated core 10 contacts, such that the resulting corrugate core 10 has an overall curvature. The resulting corrugated core 10 would then look similar to the one in FIG. 5*q*.

Figure 9A:
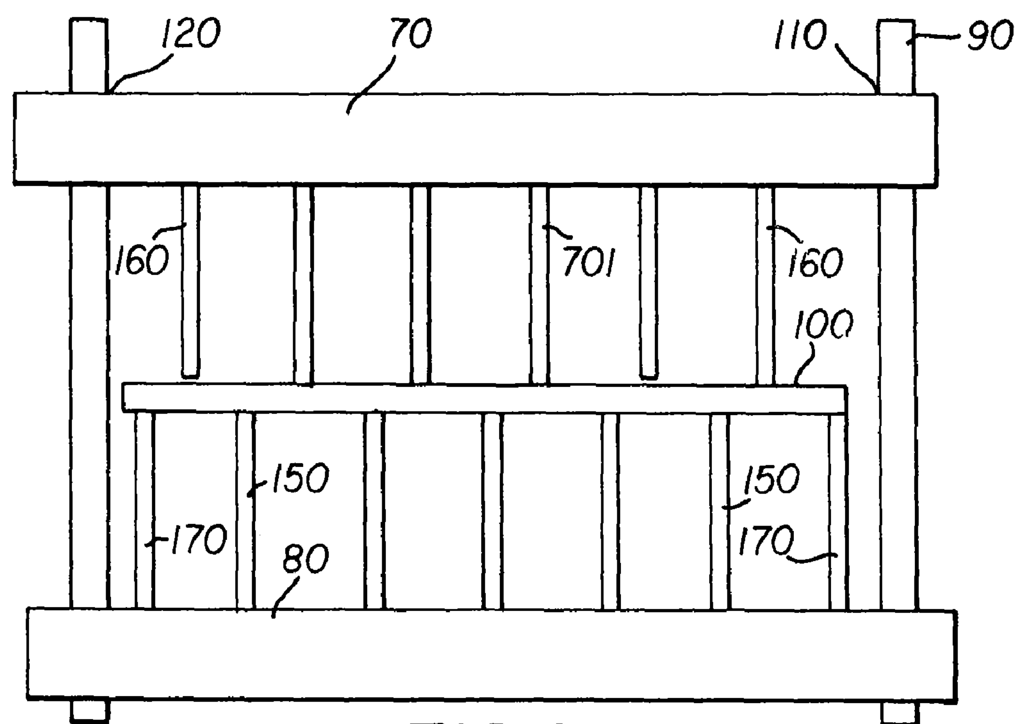
FIG. 9*a*-9*b* shows a mold design, modification to the mold in FIG. 7*a*, both before (FIG. 9*a*) and after (FIG. 9*b*) molding that will result in the mirror blank assembly shown in FIG. 7*a* and FIG. 7*b*.
Figure 9B:
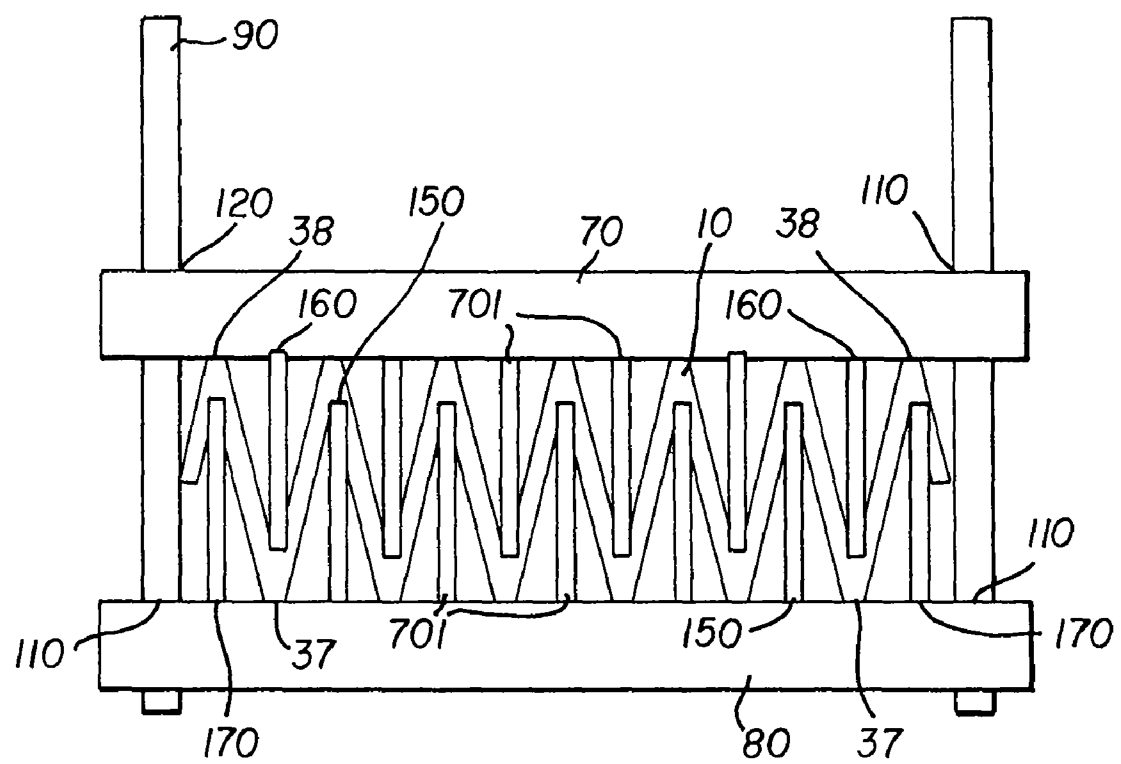

The mold design in FIG. 9*a* addresses the corrugated core 10 edge problem. An irregular edge will result when generating the corrugated core 10. An inner refractory ring 150, middle refractory ring 160, and outer refractory ring 170 was added to the FIG. 8*a* design. Typically these rings have rounded edges for the same reason the molding pegs 701 are rounded. The resulting corrugated core 10 in FIG. 9*b* will produce the inner continuous bonding region 37 and outer continuous bonding region 38, a set of rings or planes (depending in the refractory ring 150, 160, and 170 contact features), against which the face sheets 20 and 30 may fuse. Excess material may be trimmed prior to fusion. This design then solves the problems of locking the corrugated core 10 to the edge ring 40 and eliminates the edge ring 40 as a separate component. It also eliminates the problem of the corrugated core 10 edge sagging against an edge ring 40 during assembly.

The molding pegs 701 may have differing sizes (not shown). Enlarged molding pegs 701 are useful to generate reinforced mount points in the corrugated core 10. Extra pieces of glass may be laid on glass plate 100 so that after the molding process, the corrugated core 10 is thicker at mount point locations.

Either by mold design or by process control, the peaks to corrugated core 10 can be adjusted to be either flat or round. Round peaks are preferred to ensure no trapped gas between the peak to corrugated core 10 and the front face sheet 20 or back face sheet 30 during assembly.

Choosing a mold material with a coefficient of thermal expansion (CTE) higher than glass plate 100 will help to shear the material from mold. Heated parts will be stretched by the growing mold assembly 800 so that during cool down, the mold assembly 800 will shrink faster than the molded corrugated core 10 and the corrugated mold 70 and corrugated mold 80 will pull away from the newly molded corrugated core 10.

In patent application Ser. No. 10/328,524, inventors S. De Smitt, D. Strafford, and J. West described a process to make light-weight mirror cores by inflating a close-packed array of spherical glass shells. Extremely low areal densities were achieved however, a process to economically produce the sealed shells in large quantities, and in preferred materials, can be further improved upon.

EXAMPLE

An 11.375-inch (288.9 mm) graphite mold formed a corrugated core from borosilicate glass by heating the glass to 750° C. for 90 minutes. The borosilicate glass was 1.1 mm thick and 10 inches (254 mm) in diameter. (Nominal dimensions are listed without parentheses.)

Ten-inch (254 mm) diameter face sheets, and a 1/16-inch (1.5875 mm) thick edge ring were fused to the corrugated core at a 750° C. furnace set point temperature and held for 45 minutes. During the heat up cycle the pressure was increased from 10.0 psig to 10.8 psig when the temperature set point heated between 650° C.-750° C.

During a cool down cycle from 750° C. to 500° C. the pressure was decreased from nominally 10.8 psig to 9.8 psig. After the part cooled to room temperature a small, 0.050 inch (1.27 mm), diameter hole was drilled into the edge ring to vent the blank.

The part was molded piano on both sides. After the molding completed step the part measured 12 μm peak-to-valley on the front face sheet and the back face sheet measured about 30 μm peak-to-valley due to sagging.

The invention has been described with reference to a preferred embodiment; however, it will be appreciated that variations and modifications can be effected by a person of ordinary skill in the art without departing from the scope of the invention.

PARTS LIST

10 corrugated core
20 front face sheet
25 interlayer plate
30 back face sheet
37 inner continuous bonding region
38 outer continuous bonding region
40 edge ring

50 refractory mass
60 refractory blocks
70 upper corrugated mold
80 lower corrugated mold
90 alignment pin
100 glass plate
110 alignment hole
120 alignment slot
150 inner refractory ring
160 middle refractory ring
170 outer refractory ring
300 strut
350 light path
400 reinforced mounting region
410 reinforcing post
430 secondary mirror
499 unfused mirror blank assembly
500 mirror blank assembly
450 solid mirror blank
650 precise optical surface
700 refractory cones
701 molding pegs
800 mold assembly

What is claimed is:

1. A mirror blank assembly comprising first and second face sheets substantially opposed to each other, a sheet of corrugated material sandwiched between the first and second face sheets, wherein the sheet of corrugated material is two dimensional to provide a substantially uniform support to the first and second face sheets, and a circumferential edge of the first face sheet and a circumferential edge of the second face sheet are directly connected to each other to enclose the sheet of corrugated material, and the sheet of corrugated material includes in a first cross-section, a first continuous single line of round peaks connected to round valleys that substantially forms a first sine wave-like configuration, and in a second cross-section, a second continuous single line of round peaks connected to round valleys that substantially forms a second sine wave-like configuration, wherein the first cross-section is oriented transversely to the second cross-section.

2. The mirror blank assembly of claim 1 wherein the circumferential edge of the first face sheet and the circumferential edge of the second face sheet are directly connected to each other by crimping.

3. The mirror blank assembly of claim 1 wherein the sheet of corrugated material includes peaks and valleys, and the peaks are configured to abut the first face sheet and the valleys are configured to abut the second face sheet.

4. The mirror blank assembly of claim 1, wherein the round peaks and round valleys are formed by two mating molds of a similar pattern, and one mating mold is shifted, so that peaks of one mold are aligned with valleys of the other mold.

5. A mirror blank assembly comprising first and second face sheets substantially opposed to each other, a sheet of corrugated material sandwiched between the first and second face sheets, wherein the sheet of corrugated material is two dimensional to provide a substantially uniform support to the first and second face sheets, and the sheet of corrugated material includes in a first cross-section, a first continuous single line of round peaks connected to round valleys that substantially forms a first sine wave-like configuration, and in a second cross-section, a second continuous single line of round peaks connected to round valleys that substantially forms a second sine wave-like configuration, and the first cross-section is oriented 60° with respect to the second cross-section wherein a circumferential edge of the first face sheet and a circumferential edge of the second face sheet are directly connected to each other to enclose the sheet of corrugated material.

6. The mirror blank assembly of claim 5, wherein the round peaks and round valleys are formed by two mating molds of a similar pattern, and one mating mold is shifted, so that peaks of one mold are aligned with valleys of the other mold.

* * * * *